United States Patent
Wu

(10) Patent No.: US 10,645,568 B2
(45) Date of Patent: May 5, 2020

(54) CARRIER CONFIGURATION PROCESSING METHOD, DEVICE AND SYSTEM, AND COMPUTER STORAGE MEDIUM

(71) Applicant: ZTE Corporation, Shenzhen (CN)

(72) Inventor: Chuanxi Wu, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/752,218

(22) PCT Filed: Sep. 23, 2015

(86) PCT No.: PCT/CN2015/090387
§ 371 (c)(1),
(2) Date: Feb. 12, 2018

(87) PCT Pub. No.: WO2016/145816
PCT Pub. Date: Sep. 22, 2016

(65) Prior Publication Data
US 2019/0007825 A1    Jan. 3, 2019

(30) Foreign Application Priority Data
Aug. 14, 2015 (CN) .......................... 2015 1 0501916

(51) Int. Cl.
*H04W 8/20* (2009.01)
*H04W 8/18* (2009.01)
(Continued)

(52) U.S. Cl.
CPC ............ *H04W 8/205* (2013.01); *H04W 12/06* (2013.01); *H04W 24/02* (2013.01); *H04W 8/183* (2013.01); *H04W 8/265* (2013.01); *H04W 12/04* (2013.01)

(58) Field of Classification Search
CPC ..... H04W 8/205; H04W 12/06; H04W 24/02; H04W 12/04; H04W 8/183; H04W 8/265
See application file for complete search history.

(56) References Cited

U.S. PATENT DOCUMENTS

2013/0227646 A1    8/2013 Haggerty et al.
2015/0067351 A1*   3/2015 Wang ................ H04W 12/1206
                                                    713/189
(Continued)

FOREIGN PATENT DOCUMENTS

CN    103747104 A    4/2014
CN    103974250 A    8/2014
(Continued)

OTHER PUBLICATIONS

Supplementary European Search Report in European application No. 15885188.1, dated May 11, 2018.
(Continued)

*Primary Examiner* — Joseph E Dean, Jr.
(74) *Attorney, Agent, or Firm* — McDonald Hopkins LLC

(57) ABSTRACT

Disclosed are a carrier configuration processing method, device and system, and computer storage medium. The method comprises: acquiring, by an embedded universal integrated circuit card (eUICC), a carrier configuration transmitted by a subscription management platform; and assembling, by the eUICC and in an allocated storage space, an executable application and file system according to the acquired carrier configuration.

18 Claims, 9 Drawing Sheets

(51) Int. Cl.
    *H04W 8/26*     (2009.01)
    *H04W 24/02*     (2009.01)
    *H04W 12/06*     (2009.01)
    *H04W 12/04*     (2009.01)

(56) References Cited

U.S. PATENT DOCUMENTS

| | | | |
|---|---|---|---|
| 2015/0163056 A1* | 6/2015 | Nix | H04L 63/0435 380/46 |
| 2016/0226877 A1 | 8/2016 | Haggerty et al. | |
| 2016/0283216 A1 | 9/2016 | Gao | |

FOREIGN PATENT DOCUMENTS

| | | |
|---|---|---|
| CN | 104703170 A | 6/2015 |
| EP | 3065431 A | 9/2016 |
| WO | 2013123233 A2 | 8/2013 |

OTHER PUBLICATIONS

CSMG: "Reprogrammable SIMs: Technology, Evolution and Implications", Internet Citation, Sep. 25, 2012 (Sep. 25, 2012), pp. 1-95, XP002716258, Retrieved from the Internet : URL:http://stakeholders.ofcom.org.uk/binaries/research/telecoms-research/reprogrammable-sims.pdf [retrieved on Nov. 12, 2013] * paragraphs 5.15-5.25, 12.12*.

English Translation of International Search Report in international application No. PCT/CN2015/090387, dated May 10, 2016.

English Translation of The Written Opinion of the International Search Authority in international application No. PCT/CN2015/090387, dated May 10, 2016.

* cited by examiner

CARRIER CONFIGURATION PROCESSING METHOD, DEVICE AND SYSTEM, AND COMPUTER STORAGE MEDIUM

TECHNICAL FIELD

The disclosure relates to an Internet of things technology in the field of communications, and particularly to an operator configuration processing method, device and system for an embedded Universal Integrated Circuit Card (eUICC) in an Internet of things terminal, and a computer storage medium.

BACKGROUND

The Internet of things, called as a third wave of the world information industry after computer and the Internet, represents a development direction of a next-generation information technology. The United States, the European Union, China and the like have introduced Internet of things development plans in succession and completed forward-looking layouts of related technologies and industries. Along with popularization of an Internet of things technology, more and more conventional commodities such as an automobile, a smart meter and a monitoring device are provided with eUICCs, that is, Universal Integrated Circuit Card (UICC) chips are directly welded on circuit boards of Internet of things terminals or directly packaged in communication modules in the Internet of things terminals, to form the Internet of things terminals.

As an authentication tool for access of an Internet of things terminal to an operator network and a security carrier bearing various applications and data, an eUICC has become a critical core technology for development of the Internet of things. An eUICC which should be configured for an Internet of things service is not only a new UICC form or a user terminal device form, but also includes the whole system established for such device in the new form. A number of objects in the Internet of things may be several orders of magnitude larger than a number of terminals in any network. An original terminal identification method is usually implemented with a string of code numbers or card numbers. If an Internet of things application is developed in an existing technical system, it is necessary to provide sufficient code number resources to mark terminals or users in a ubiquitous network.

UICCs (for example, Subscriber Identity Module (SIM) cards) in a current mobile network are issued by adopting a regional (provinces and cities) network management method according to different issuing places, using places and card uses. However, in an Internet of things application scenario, due to the characteristic of incapability in plugging and unplugging in an Internet of things terminal, an eUICC usually exists in the Internet of things terminal or is usually welded in a communication module in the Internet of things terminal, it is very difficult to determine its issuing place and using place when the Internet of things terminal is produced, and an operator configuration (information such as an operator network which may be accessed by the eUICC and available application and data functions is set) in the eUICC may not be modified. That is, a lifecycle of a conventional eUICC has a linear characteristic, and the lifecycle of the conventional eUICC includes stages of card making, operator selection, customization, issuing, activation, using and subscription termination, and has an irreversible characteristic.

During practical use, a user is usually required to modify an operator used by an eUICC (corresponding Internet of things terminal) or modify application and data. functions provided by the currently used operator. Because of the characteristic of incapability of the eUICC inplugging and unplugging and the linear characteristic of the lifecycle, a requirement of the user on updating of the operator accessed by the eUICC or the application and data functions provided by an accessed operator network may not be supported.

SUMMARY

Embodiments of the disclosure provide an operator configuration processing method, device and system and a computer storage medium, which may support updating (for example, switching) of an operator configuration of an eUICC, thereby meeting a requirement of a user on modification of an operator network accessed by the eUICC or modification of application and data functions provided by the operator network used by the eUICC.

The technical solutions of the embodiments of the disclosure are implemented as follows.

The embodiments of the disclosure provide an operator configuration processing method, which may be applied to an eUICC, the method including that:

the eUICC acquires an operator configuration transmitted by a subscription management platform; and the eUICC assembles the acquired operator configuration into an executable application and file system in an allocated storage space.

The embodiments of the disclosure further provide an operator configuration processing method, which may be applied to a subscription management platform, the method including that:

the subscription management platform verifies an operator configuration downloading request of a user or an operator; and when verification succeeds and it is determined that an eUICC supports downloading of an operator configuration, the operator configuration is transmitted to the eUICC, the operator configuration being configured to enable the eUICC to assemble the operator configuration into an executable application and file system in an allocated storage space.

The embodiments of the disclosure provide an eUICC, which may include:

an acquisition unit, configured to acquire an operator configuration transmitted by a subscription management platform; and an assembling unit, configured to assemble the acquired operator configuration into an executable application and file system in an allocated storage space.

The embodiments of the disclosure further provide a subscription management platform, which may include:

a verification unit, configured to verify an operator configuration downloading request of a user or an operator; and a transmission unit, configured to, when the verification unit succeeds in verification and determines that an eUICC supports downloading of an operator configuration, transmit the operator configuration to the eUICC, the operator configuration being configured to enable the eUICC to assemble the operator configuration into an executable application and file system in an allocated storage space.

The embodiments of the disclosure provide an operator configuration processing system, which may include an eUICC and a subscription management platform, wherein the eUICC may be configured to acquire an operator configuration transmitted by the subscription management platform, and assemble the acquired operator configuration into an executable application and file system in an allocated storage space; and the subscription management platform may be configured to verify an operator configuration downloading request of a user or an operator, and when verification succeeds and it is determined that the eUICC supports downloading of the operator configuration, transmit the operator configuration to the eUICC.

The embodiments of the disclosure further provide a computer storage medium, in which an executable instruction may be stored, the executable instruction being configured to execute any abovementioned operator configuration processing method.

In the embodiments of the disclosure, the user or operator of an Internet of things terminal may trigger of transmission of the operator configuration to the eUICC in a manner of sending the operator configuration downloading request to the subscription management platform, then the eUICC loads the operator configuration as the executable application and file system, and the executable application and file system assembled in the eUICC may be selected through an interface between the Internet of things terminal and the eUICC, that is, the operator configuration in the eUICC is selected; and subsequently, the selected operator configuration may be activated to implement redefinition about a lifecycle of the eUICC. For example, an operator network accessed by the eUICC may be selected, and subscription may be terminated. That is, operator selection and operator changing may still be allowed in a using process after the eUICC is issued, and its user relationship is a traceable relationship, so that flexibility is higher, a selection space of using application and data services of different operator networks is provided for the user, and higher flexibility and customizability are achieved.

DETAILED DESCRIPTION

The disclosure will further be described below in combination with the drawings and the embodiments in detail. It should be understood that the specific embodiments described here are adopted not to limit the disclosure but only to explain the disclosure.

First Embodiment

Figure 1:
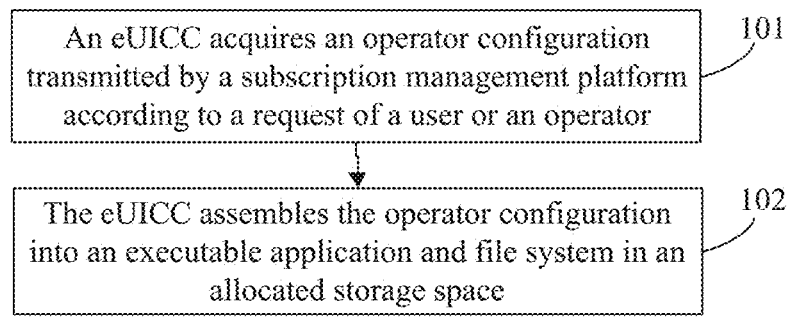
FIG. 1 is a first flowchart of an operator configuration processing method according to an embodiment of the disclosure.

The embodiment of the disclosure records an operator configuration processing method, which, referring to FIG. 1, may be applied to an eUICC of an Internet of things terminal. The eUICC forms an operator configuration processing system shown in FIG. 2 with a subscription management platform.

Referring to FIG. 1, in Step 101, the eUICC in the Internet of things terminal acquires an operator configuration transmitted by the subscription management platform according to a request of a user or an operator (the operator configuration is actually transmitted to the Internet of things terminal with the eUICC so as to be transmitted to the eUICC in the Internet of things terminal); and in Step 102, the eUICC assembles the operator configuration into an executable application and file system in an allocated storage space.

The operator configuration (also called as an operator configuration file in a related technology) describes a structure of a file system in the eUICC and a specific content (for example, an International Mobile Subscriber Identity (IMSI)) in the structure of the file system, the executable application and file system has a basic function of registration of a related parameter in an operator network for access to the operator network, and may further provide application and data functions of the operator network, and the operator configuration is made by the operator, and is different for different operating companies.

The storage space in the eUICC may be preset. Exemplarily, when the user or the operator submits the operator configuration downloading request to the subscription management platform, if the operator configuration downloading request passes verification of the subscription management platform (for example, when the operator initiates the operator configuration downloading request, whether the operator configuration requested to be downloaded belongs to the operator is verified; and for another example, when the user initiates the operator configuration downloading request, whether an operator configuration downloading credential contained in the operator configuration downloading request is consistent with a credential stored in the subscription management platform is verified), a storage block creation request may be sent to the eUICC during subsequent mutual authentication, to enable the eUICC to allocate the storage space and assemble the operator configuration into the executable application and file system in the allocated storage space.

After the operator configuration downloading request passes verification of the subscription management platform, exemplarily, the subscription management platform may perform mutual authentication with the eUICC to establish a secure link (called as a first secure link), a storage space is created in the eUICC according to the storage block creation request sent by the subscription management platform on the basis of the first secure link, and then the first secure link gets invalid.

Subsequently, the eUICC performs mutual authentication with the subscription management platform to establish a second secure link and an operator configuration security protection key; and the subscription management platform performs encryption and integrity protection on the operator configuration, and then sends it to the eUICC by virtue of the second secure link to improve security, and the eUICC decrypts the encrypted operator configuration after security verification, and assembles the operator configuration into the executable application and file system in the pre-allocated storage space.

During specific implementation of transmission processing of the operator configuration, since there is no practical physical interface between the subscription management platform and the eUICC, a specific transmission channel is required to be established between the eUICC and the subscription management platform to download the operator configuration, and exemplarily, the transmission channel may be implemented on the basis of an Over The Air (OTA) technology.

After the eUICC assembles the operator configuration into the executable application and file system, exemplarily, an operator configuration downloading and assembling completion message may be notified to the subscription management platform to enable the subscription management platform to update an information set of the corresponding eUICC, the information set of the eUICC stores operator configuration already assembled by the eUICC (the information set of the eUICC may include multiple operator configurations already assembled by the eUICC) and a state of the operator configuration of the eUICC, including an activated state and a deactivated state, and when the operator configuration is in the activated state, it is indicated that the eUICC accesses the corresponding operator network by virtue of the executable application and file system assembled from the operator configuration, and uses application and data functions provided by the operator network; and after the information set corresponding to the eUICC is maintained and updated, the operator configuration downloading request from the user or the operator may be verified by virtue of information about the operator configuration already assembled in the eUICC and a preset rule policy in the information set of the eUICC (for example, whether there exists a conflict between the assembled operator configuration in the eUICC and the operator configuration required to be downloaded) when an operator configuration activation request of the corresponding eUICC is received.

The operator configuration successfully downloaded and assembled by the eUICC is in the deactivated state as a default, and after successful downloading and assembling, the eUICC notifies an operator configuration downloading completion message to the subscription management platform to enable the subscription management platform to update the information set of the corresponding eUICC and to add the downloaded and assembled operator configuration and the corresponding state (deactivated) into the information set of the eUICC.

The processing step of assembling the operator may be executed for many times to assemble multiple operator configurations in the eUICC. A specific assembling number is determined by the storage space of the eUICC and an operator configuration subscribed by the eUICC. The user may trigger (or the operator triggers) the eUICC to activate an operator configuration expected to be used to enable the eUICC to access a corresponding operator network on the basis of an executable application and file system assembled from the operator configuration expected to be used by the user and use application and data functions provided by the operator network, so that a requirement of the user on personalized selection of the operator network is met. When the user expects the eUICC to provide application and data functions provided by another operator, the eUICC may be triggered to deactivate the operator configuration currently in the activated state and activate an operator configuration of the other operator expected to be used, so that the eUICC may select and switch the operator to be used (the application and data functions of the operator to be used), selection and switching of the operator are implemented, a selection space of using services of different operating companies is provided for the user, and higher flexibility and customizability are achieved.

The operator configuration is configured to provide communication service for the Internet of things terminal. Specifically, a process of activating an operator configuration is completed by an Internet of things terminal with an eUICC required to be activated by virtue of an IMSI corresponding to the eUICC required to be activated and an operator network accessed by a temporary code number associated with the MIST, an operator configuration activation request may be sent to the subscription management platform by the user or an operator, when the subscription management platform accepts the operator configuration activation request, the eUICC may check whether there is a conflict between a currently executed policy rule and a policy rule of an operator configuration required to be activated in a target operator configuration (the target operator configuration is an operator configuration assembled in the eUICC), and if there is a conflict, the flow is terminated, and a result is correspondingly notified to the user or the operator; and if there is no conflict, the target operator configuration is activated.

When the target operator configuration is activated, the eUICC checks whether there is an operator configuration in the activated state in the operator configurations assembled by the eUICC; if there is an operator configuration in an activated state, the operator configuration in the activated state is deactivated, and the target operator configuration is activated; and if there is no operator configuration in an activated state, the target operator configuration is directly activated, and an operation result of activation of the target operator configuration is notified to the subscription management platform to enable the subscription management platform to update states of the operator configurations assembled by the eUICC in the information set corresponding to the eUICC. For example, when the eUICC only activates the target operator configuration (that is, the eUICC has no operator configuration in the activated state), a state of a target operator is updated to be activated in the information set; and if there is an operator configuration in the activated state in the eUICC (the eUICC may deactivate the operator configuration in the activated state before activating the target operator configuration), the state of the target operator is updated to be activated in the information set, and the operator configuration originally in the activated state is updated to be deactivated.

Second Embodiment

Figure 2:
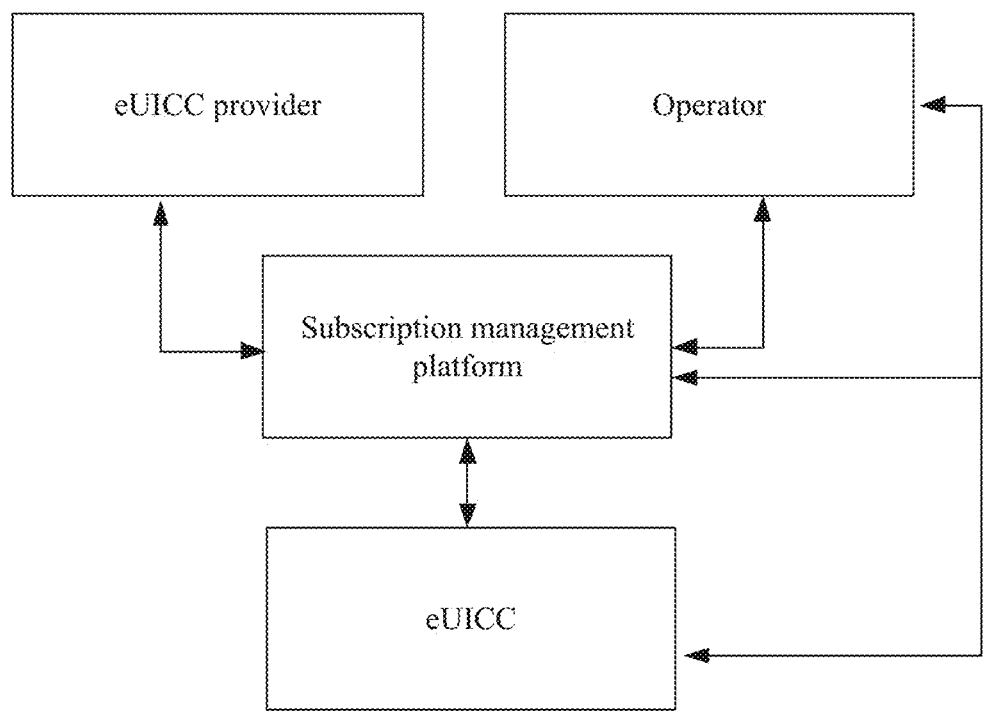
FIG. 2 is a structure diagram of an operator configuration processing system according to an embodiment of the disclosure.
Figure 3:
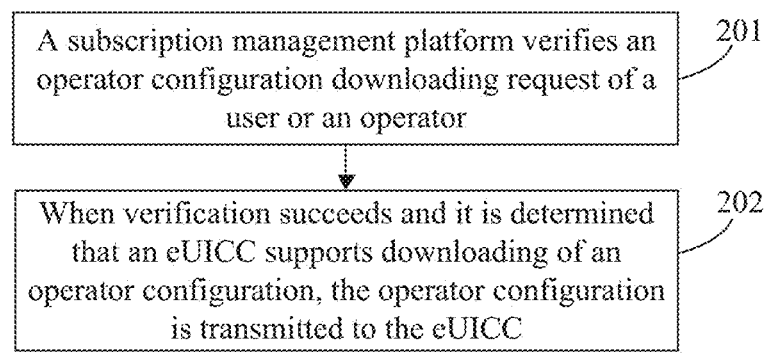
FIG. 3 is a second flowchart of an operator configuration processing method according to an embodiment of the disclosure.

Corresponding to a configuration processing method for an eUICC shown in FIG. 2, FIG. 3 shows a flowchart of an operator configuration processing method applied to a subscription management platform. Referring to FIG. 2 and FIG. 3, in Step 201, a subscription management platform verifies an operator configuration downloading request of a user or an operator; and in Step 202, when verification succeeds and it is determined that an eUICC supports an operator configuration, the operator configuration is transmitted to the eUICC, to enable the eUICC to assemble the downloaded operator configuration into an executable application and file system.

The subscription management platform may transmit the operator configuration generated by the operator into the eUICC according to the operator configuration downloading request of the operator or the user. Since there is not practical physical interface between the subscription management platform and the eUICC (specifically referring to an Internet of things terminal with the eUICC, for convenient description, descriptions will subsequently made with the eUICC as an object, and the eUICC may practically equivalent to the Internet of things terminal with the eUICC), the subscription management platform is required to establish a transmission channel (which may be implemented by, for example, OTA) to the eUICC to download the operator configuration. The eUICC assembles the downloaded operator configuration into the executable application and file system, the executable application and file system has a basic function of registration of a related parameter when the eUICC accesses the operator network for use of application and data functions of the operator network, and the successfully assembled operator configuration enters a deactivated state as a default.

When acquiring an operator configuration downloading completion message notified by the eUICC, the subscription management platform updates an information set corresponding to the eUICC, wherein the newly assembled operator configuration and a state (deactivated state) of the operator configuration are added into the information set of the eUICC; and when an initiator of the operator configuration downloading request is the operator, an operator configuration downloading and assembling success message may further be sent to the operator.

When the subscription management platform verifies the operator configuration downloading request of the user or the operator, if a requester is the operator, whether to transmit the operator configuration to the eUICC is determined on the basis of whether the operator configuration requested by the configuration downloading request belongs to the operator; and when the requester is the user, whether to transmit the operator configuration to the eUICC is determined on the basis of whether an operator configuration downloading credential contained in the configuration downloading request is consistent with a stored credential.

After the operator configuration downloading request of the user or the operator passes verification of the subscription management platform, whether the eUICC may download the operator configuration is further determined on the basis of a preset policy rule (for example, whether there is a conflict between an operator configuration assembled in the eUICC and the operator configuration required to be downloaded), and on the basis of the operator configuration already assembled by the eUICC in the information set corresponding to the eUICC, and it is determined that the eUICC supports downloading of the operator configuration on the basis of a physical state (for example, A storage space) of the eUICC.

When it is determined that the eUICC supports downloading of the operator configuration, the subscription management platform performs mutual authentication with the eUICC supporting downloading of the operator configuration to establish a first secure link, and sends a storage block creation request to the eUICC on the basis of the first secure link to enable the eUICC to create the storage space, and then the first secure link gets invalid. Subsequently, the subscription management platform performs mutual authentication with the eUICC to establish a second secure link and an operator configuration security protection key, and transmits, to the eUICC on the basis of the second secure link, the operator configuration subjected to encryption and integrity protection with the key, so as to enable the eUICC to decrypt the encrypted operator configuration after security verification and assemble the operator configuration into the allocated storage space.

The storage block creation request is sent to the eUICC supporting downloading of the operator configuration on the basis of the secure link to enable the eUICC supporting downloading of the operator configuration to create the storage space; and the operator configuration encrypted with the key is transmitted to the eUICC supporting downloading of the operator configuration on the basis of the secure link to enable the eUICC to load the operator configuration into the executable application and file system in the storage space.

The eUICC is required to perform activation before using the operator configuration for the first time, and the subscription management platform activates the operator configuration currently in the deactivated state on the eUICC, and then the executable application and file system assembled in the eUICC may be selected through an interface between the Internet of things terminal and the eUICC, that is, the operator configuration assembled by the eUICC is selected to access an operator network and provide application and data functions of the operator.

Wherein, activation of the eUICC refers to that the eUICC acquires and assembles the operator configuration, and the operator configuration is configured to provide communication service for the Internet of things terminal. Specifically, an activation process is completed by an Internet of things terminal with an eUICC required to be activated by virtue of an IMSI corresponding to the eUICC required to be activated and an operator network accessed by a temporary code number associated with the IMSI.

Deactivation of the eUICC refers to that the subscription management platform deactivates an operator configuration currently in an activated state on the eUICC to make a file and application assembled on the basis of the operator configuration not support selection through the interface between the Internet of things terminal and the eUICC.

When the subscription management platform receives the operator configuration downloading request, a container configured to store the operator configuration is created on the eUICC at first, then an encryption key required by operator configuration content protection between the subscription management platform and the eUICC is established, and the subscription management platform finally downloads the operator configuration into the eUICC. The operator configuration downloading request may be initiated by the operator, and may also be initiated by the user through the eUICC.

When the subscription management platform acquires an operation result of activation of the eUICC over the operator configuration, the state of the operator configuration assembled by the eUICC in the information set corresponding to the eUICC is updated. For example, when the eUICC only activates a target operator configuration (that is, there is no operator configuration in the activated state in the eUICC), a state of a target operator is updated to be activated in the information set; and if there is an operator configuration in the activated state in the eUICC (the eUICC may deactivate the operator configuration in the activated state before activating the target operator configuration), the state of the target operator is updated to be activated in the information set, and the operator configuration originally in the activated state is updated to be deactivated.

Third Embodiment

Figure 4:
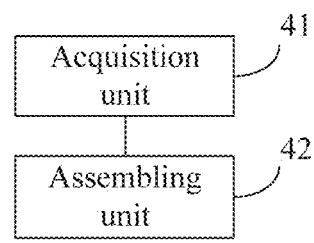
FIG. 4 is a functional structure diagram of an eUICC according to an embodiment of the disclosure.

Corresponding to FIG. 2, the embodiment of the disclosure further records an eUICC, which, as shown in FIG. 4, includes:

an acquisition unit 41, configured to acquire an operator configuration transmitted by a subscription management platform; and an assembling unit 42, configured to assemble the acquired operator configuration into an executable application and file system in an allocated storage space.

Exemplarily, the eUICC further includes:

a first notification unit 43, configured to notify an operator configuration downloading completion message to the subscription management platform, wherein an assembling completion message is configured for the subscription management platform to update an information set corresponding to the eUICC and to add the operator configuration and a state of the operator configuration into the information set of the eUICC, and the newly assembled operator configuration is in a deactivated state as a default; and when an initiator of an operator configuration downloading request is an operator, an operator configuration downloading and assembling success message is sent to the initiator.

Exemplarily, the acquisition unit 41 is further configured to send, to the subscription management platform, the operator configuration downloading request for the operator configuration, wherein an operator configuration request includes an operator configuration downloading credential, and the operator configuration downloading credential is configured for the subscription management platform to verify the operator configuration downloading request, and to accept the operator configuration downloading request when verification succeeds.

Exemplarily, the eUICC further includes:

a first authentication unit 44, configured to perform mutual authentication with the subscription management platform to establish a first secure link; and the assembling unit 42 is further configured to create the storage space in the eUICC according to a storage block creation request sent by the subscription management platform on the basis of the first secure link.

Exemplarily, the eUICC further includes: a second authentication unit 45, configured to perform mutual authentication with the subscription management platform to establish a second secure link and an operator configuration security; protection key; and the assembling unit 42 is further configured to decrypt the operator configuration acquired on the basis of the second secure link and subjected to encryption and integrity protection with the key, so as to obtain the operator configuration.

Exemplarily, the eUICC further includes: a checking unit 46 and an activation unit 47;

the checking unit 46 is configured to, when the subscription management platform accepts an operator configuration activation request, check whether there is a conflict between a currently executed policy rule and a policy rule related to a target operator configuration, wherein the target operator configuration is an operator configuration required to be activated in operator configurations assembled in the eUICC; and if there is no conflict, the activation unit 47 is triggered to activate the target operator configuration.

Exemplarily, the eUICC further includes a deactivation unit 48;

the checking unit 46 is further configured to check whether there is an operator configuration in an activated state in the operator configurations assembled by the eUICC, if there is an operator configuration in an activated state, the deactivation unit 48 is triggered to deactivate the operator configuration in the activated state, and the activation unit 47 is triggered to activate the target operator configuration; and if there is no operator configuration in an activated state, the activation unit 47 is directly triggered to activate the target operator configuration.

Exemplarily, the eUICC further includes:

a second notification unit 49, configured to notify an operation result of activation of the target operator configuration to the subscription management platform, to enable the subscription management platform to update states of the operator configurations assembled by the eUICC in the information set corresponding to the eUICC.

The eUICC is actually an on-chip system, and may be implemented by an Application Specific Integrated Circuit (ASIC) or a Field-Programmable Gate Array (FPGA). Exemplarily, the eUICC may include: a Central Processing Unit (CPU), configured for control, calculation and operation; a Read-Only Memory (ROM), configured to store the whole on-chip operating system (the abovementioned file system); an Erasable Programmable Read-Only Memory (EPROM), storing the abovementioned file system and any information required to be read and written by an application program; and a Random Access Memory (RAM), configured to store temporary data in a calculation process of the CPU.

Fourth Embodiment

The embodiment of the disclosure further records an Internet of things terminal, which includes an eUICC shown in FIG. 4. When an operator network accessed by the Internet of things terminal is required to be switched and updated, a user or an operator may submit an operator configuration downloading request to a subscription management platform, then the subscription management platform to transmit an operator configuration to the eUICC in the Internet of things terminal when the configuration downloading request passes verification, and the eUICC assembles the operator configuration into an executable application and file system by itself. A target operator configuration (i.e., an operator configuration expected to be used by the user) is activated, an operator configuration originally in an activated state is deactivated to implement switching and updating of the operator network accessed by the Internet of things terminal.

Fifth Embodiment

Figure 5:
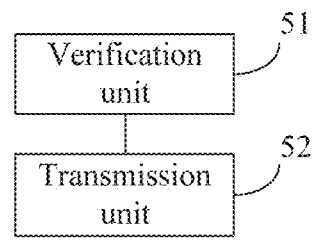
FIG. 5 is a functional structure diagram of a subscription management platform according to an embodiment of the disclosure.

Corresponding to processing of FIG. 3, the embodiment records a subscription management platform, which, as shown in FIG. 5, includes:

a verification unit 51, configured to verify an operator configuration downloading request of a user or an operator; and a transmission unit 52, configured to, when the verification unit 51 succeeds in verification and determines that an eUICC supports downloading of an operator configuration, transmit the operator configuration to the eUICC, the operator configuration being configured to enable the eUICC to assemble the operator configuration into an executable application and file system in an allocated storage space.

Exemplarily, the subscription management platform further includes:

an updating unit 53, configured to, when an operator configuration downloading completion message notified after the eUICC assembles the operator configuration is acquired, update an information set corresponding to the eUICC, wherein the target operator configuration and a state of the target operator configuration are added into the information set of the eUICC; and the updating unit 53 is further configured to, when an initiator of the operator configuration downloading request is the operator, send an operator configuration downloading and assembling success message to the initiator.

Exemplarily, the verification unit 51 is further configured to, when a requester is the operator, determine whether to transmit the operator configuration to the eUICC on the basis of whether the operator configuration requested by the configuration downloading request belongs to the operator; and the verification unit 51 is further configured to, when the requester is the user, determine whether to transmit the operator configuration to the eUICC on the basis of whether an operator configuration downloading credential contained in the configuration downloading request is consistent with a stored credential.

Exemplarily, the subscription management platform further includes:

a third authentication unit 54, configured to perform mutual authentication with the eUICC to establish a first secure link; and the transmission unit 52 is further configured to send a storage block creation request to the eUICC on the basis of the first secure link to enable the eUICC to create the storage space.

Exemplarily, the subscription management platform further includes:

a fourth authentication module, 55, configured to perform mutual authentication with the eUICC to establish a second secure link and an operator configuration security protection key; and the transmission unit 52 is further configured to transmit, to the eUICC on the basis of the second secure link, the operator configuration subjected to encryption and integrity protection with the key.

Exemplarily, the verification unit 51 is further configured to determine that the eUICC supports downloading of the operator configuration on the basis of a preset policy rule, and on the basis of the operator configuration already assembled by the eUICC in the information set corresponding to the eUICC, and determine that the eUICC supports downloading of the operator configuration on the basis of a physical state of the eUICC.

Exemplarily, the updating unit 53 is further configured to, when an operation result of activation of the eUICC over the target operator configuration is acquired, update the state of the operator configuration assembled by the eUICC in the information set corresponding to the eUICC.

The verification unit 51, the updating unit 53 and the third authentication unit 54 may be implemented by a processor, Micro Control Unit (MCU), ASIC or FPGA in the subscription management platform; and the transmission unit 52 may be implemented by a communication module (for example, a 2nd/3rd/4th-Generation (2/3/4-G) communication module) in the subscription management platform to transmit the operator configuration through a communication network.

Sixth Embodiment

As shown in FIG. 1, the embodiment of the disclosure further records an operator configuration processing system, which includes: a subscription management platform and an eUICC.

The eUICC, is configured to acquire an operator configuration transmitted by the subscription management platform, and assemble the acquired operator configuration into an executable application and file system in an allocated storage space; and the subscription management platform is configured to verify an operator configuration downloading request of a user or an operator, and when verification succeeds and it is determined that the eUICC supports downloading of the operator configuration, transmit the operator configuration to the eUICC.

Exemplarily, the eUICC is further configured to notify an operator configuration downloading completion message to the subscription management platform, wherein the operator configuration downloading completion message is configured for the subscription management platform to update an information set corresponding to the eUICC and to add the operator configuration and a state of the operator configuration into the information set of the eUICC.

Exemplarily, the eUICC is further configured to send, to the subscription management platform, the operator configuration downloading request for the operator configuration, an operator configuration request including an operator configuration downloading credential for the subscription management platform to verify the operator configuration downloading request, and to accept the operator configuration downloading request when verification succeeds.

Exemplarily, the eUICC is further configured to perform mutual authentication with the subscription management platform to establish a first secure link, and create the storage space in the eUICC according to a storage block creation request sent by the subscription management platform on the basis of the first secure link.

Exemplarily, the operation that the eUICC acquires the operator configuration transmitted by the subscription management platform includes that:

the eUICC performs mutual authentication with the subscription management platform to establish a second secure link and an operator configuration security protection key; and the operator configuration acquired on the basis of the second secure link and subjected to encryption and integrity protection with the key is decrypted to obtain the operator configuration.

Exemplarily, the eUICC is further configured to, when the subscription management platform accepts an operator configuration activation request, check whether there is a conflict between a currently executed policy rule and a policy rule related to a target operator configuration, wherein the target operator configuration is an operator configuration required to be activated in operator configurations assembled in the eUICC; and if there is no conflict, activate the target operator configuration.

Exemplarily, the eUICC is further configured to check whether there is an operator configuration in an activated state in the operator configurations assembled by the eUICC;

if there is an operator configuration in an activated state, deactivate the operator configuration in the activated state, and activate the target operator configuration; and if there is no operator configuration in an activated state, directly activate the target operator configuration.

Exemplarily, the eUICC is further configured to notify an operation result of activation of the target operator configuration to the subscription management platform, to enable the subscription management platform to update states of the operator configurations assembled by the eUICC in the information set corresponding to the eUICC.

Exemplarily, the subscription management platform is further configured to, when the operator configuration downloading completion message notified after the eUICC assembles the operator configuration is acquired, update the information set corresponding to the eUICC, wherein the target operator configuration and the state of the target operator configuration are added into the information set of the eUICC; and when an initiator of the operator configuration downloading request is the operator, send an operator configuration downloading and assembling success message to the initiator.

Exemplarily, the subscription management platform is further configured to, when a requester is the operator, determine whether to transmit the operator configuration to the eUICC on the basis of whether the operator configuration requested by the configuration downloading request belongs to the operator; and when the requester is the user, determine whether to transmit the operator configuration to the eUICC on the basis of whether the operator configuration downloading credential contained in the configuration downloading request is consistent with a stored credential.

Exemplarily, the subscription management platform is further configured to perform mutual authentication with the eUICC to establish the first secure link; and send the storage block creation request to the eUICC on the basis of the first secure link to enable the eUICC to create the storage space.

Exemplarily, the operation that the operator configuration is transmitted to the eUICC includes that:

mutual authentication is performed with the eUICC to establish the second secure link and the operator configuration security protection key; and the operator configuration subjected to encryption and integrity protection with the key is transmitted to the eUICC on the basis of the second secure link.

Exemplarily, the subscription management platform is further configured to determine that the eUICC supports downloading of the operator configuration on the basis of a preset policy rule, and on the basis of the operator configuration already assembled by the eUICC in the information set corresponding to the eUICC, and determine that the eUICC supports downloading of the operator configuration on the basis of a physical state of the eUICC.

Exemplarily, the subscription management platform is further configured to acquire the operation result of activation of the eUICC over the target operator configuration, and update the state of the operator configuration assembled by the eUICC in the information set corresponding to the eUICC.

Sixth Embodiment

The embodiment of the disclosure further records a computer storage medium, which includes an executable instruction, configured to execute the operator configuration processing method shown in FIG. 2 or FIG. 3.

Seventh Embodiment

Figure 6:
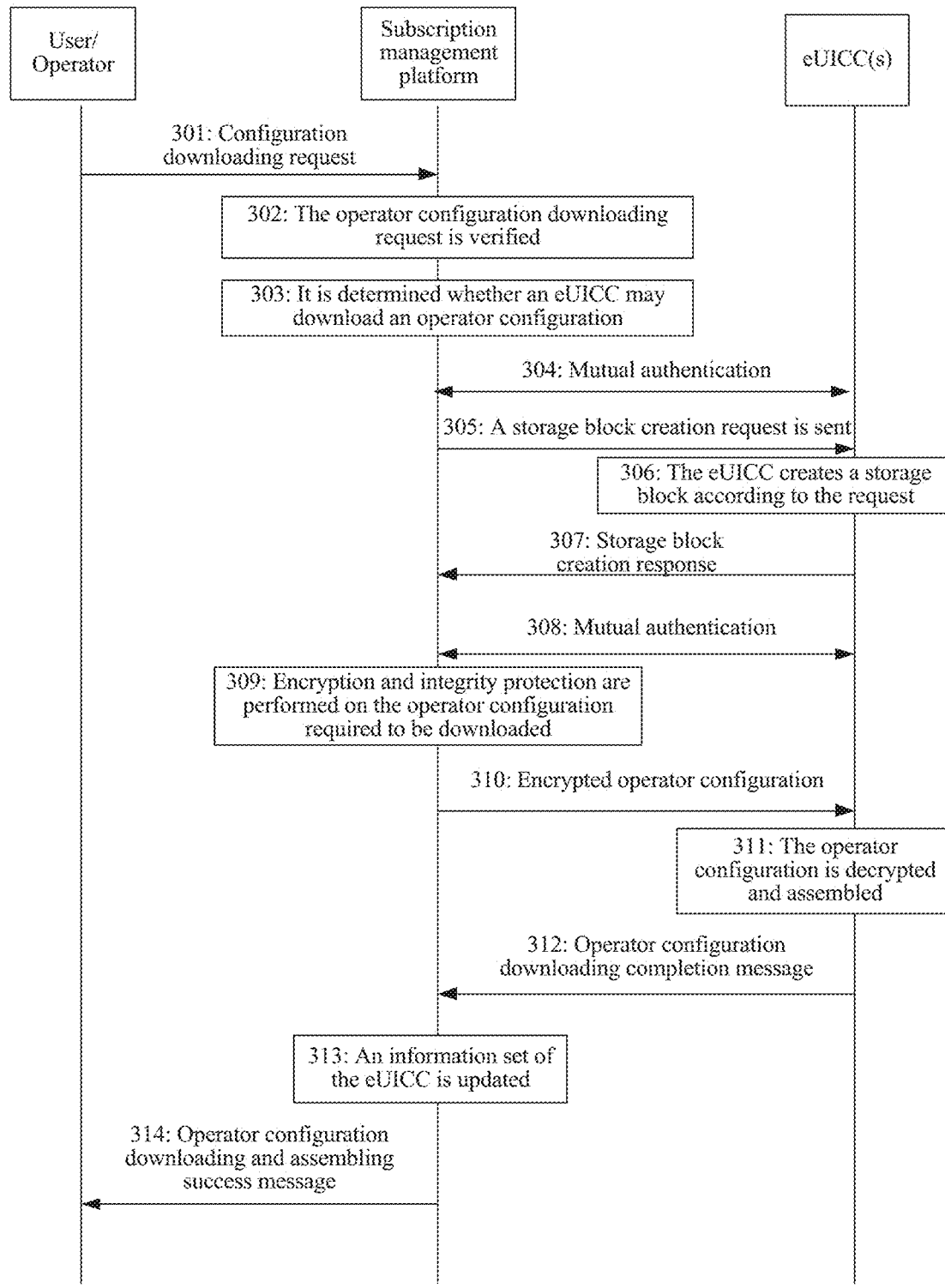
FIG. 6 is a flowchart of downloading and assembling an operator configuration according to an embodiment of the disclosure.

A specific process of downloading and assembling an operator configuration will be described below in combination with FIG. 5. Referring to FIG. 6, the following steps are included.

In Step 301, an operator or a user sends an operator configuration downloading request to a subscription management platform.

The subscription management platform is requested to download an operator configuration into an eUICC, and the operator configuration downloading request includes an IMSI, a Universal Integrate Circuit Card Identity (UICCID) configured to identify the eUICC and the like. When a requester is the operator, the operator configuration downloading request further includes an Identity (ID) of the subscription management platform or an address of the subscription management platform or the like. When the requester is the user, the user inputs an operator configuration downloading credential and the ID of the subscription management platform into the eUICC, or inputs the address of the subscription management platform into the eUICC, and the eUICC sends the operator configuration downloading request to the subscription management platform.

In Step 302, the subscription management platform verifies the operator configuration downloading request.

When the requester is the operator, the subscription management platform verities whether the operator configuration requested by the operator belongs to the operator, and if YES, the operator configuration is allowed to be downloaded. When the requester is the user, the subscription management platform verifies whether the operator configuration downloading credential contained in the operator downloading request is consistent with a credential stored in the subscription management platform, and if YES, obtains the operator configuration requested to be downloaded according to the UICCID.

In Step 303, the subscription management platform determines whether the eUICC may download the operator configuration.

After the operator configuration downloading request is accepted, the subscription management platform acquires an information set corresponding to the eUICC according to the IMSI, acquires an operator configuration assembled in the eUICC from the information set, determines whether the operator configuration may be downloaded on the basis of a preset policy rule (for example, whether there is a conflict between the operator configuration assembled in the eUICC and the operator configuration required to be downloaded), and determines whether the eUICC may support downloading of the operator configuration on the basis of a physical state of the eUICC (for example, an available storage size). Exemplarily, whether the eUICC may download the operator configuration corresponding to the UICCID is determined; and if it is determined that the eUICC may download the operator configuration corresponding to the UICCID of the eUICC, the subscription management platform continues determining whether there is a sufficient storage space configured to create a storage block in the eUICC, and if YES, Step 304 is executed, otherwise the flow is terminated, and the related operator is notified.

In Step 304, the subscription management platform performs mutual authentication with the eUICC, and after authentication succeeds, establishes a secure link to the eUICC.

In Step 305, the subscription management platform sends a storage block creation request to the eUICC.

In Step 306, the eUICC creates the storage block according to the request.

In Step 307, the eUICC sends a storage block creation response to the subscription management platform.

In Step 308, the subscription management platform performs mutual authentication with the eUICC, and after authentication succeeds, the subscription management platform establishes an operator configuration security protection key with the eUICC.

In Step 309, the subscription management platform performs encryption and integrity protection on the operator configuration required to be downloaded by virtue of the security key established in the previous step.

In Step 310, the subscription management platform sends the encrypted operator configuration to the eUICC.

In Step 311, the eUICC verifies security of data, and then decrypts and assembles the operator configuration.

In Step 312, the eUICC, sends an operator configuration downloading completion message to the subscription management platform, wherein the operator configuration downloading completion message may be authenticated by data routing and data preparation functions of the subscription management platform respectively, and indicates that the operator configuration has been successfully assembled in the eUICC.

In Step 313, the subscription management platform updates the information set of the eUICC.

Information about the operator configuration assembled by the eUICC in the information set of the eUICC is updated with the newly assembled operator configuration, so that the information of the operator configuration assembled in the eUICC is always stored in the information set of the eUICC.

In Step 314, if an initiator is the operator, the subscription management platform sends an operator configuration downloading and assembling success message to the initiator.

Eighth Embodiment

After an eUICC assembles operator configurations, an assembled operator configuration (called as a target operator configuration or an operator configuration required to be activated in the embodiment) may further be activated to access an operator network by virtue of an executable application and file system assembled on the basis of the target operator configuration and use application and data functions provided by the operator network.

Figure 7:
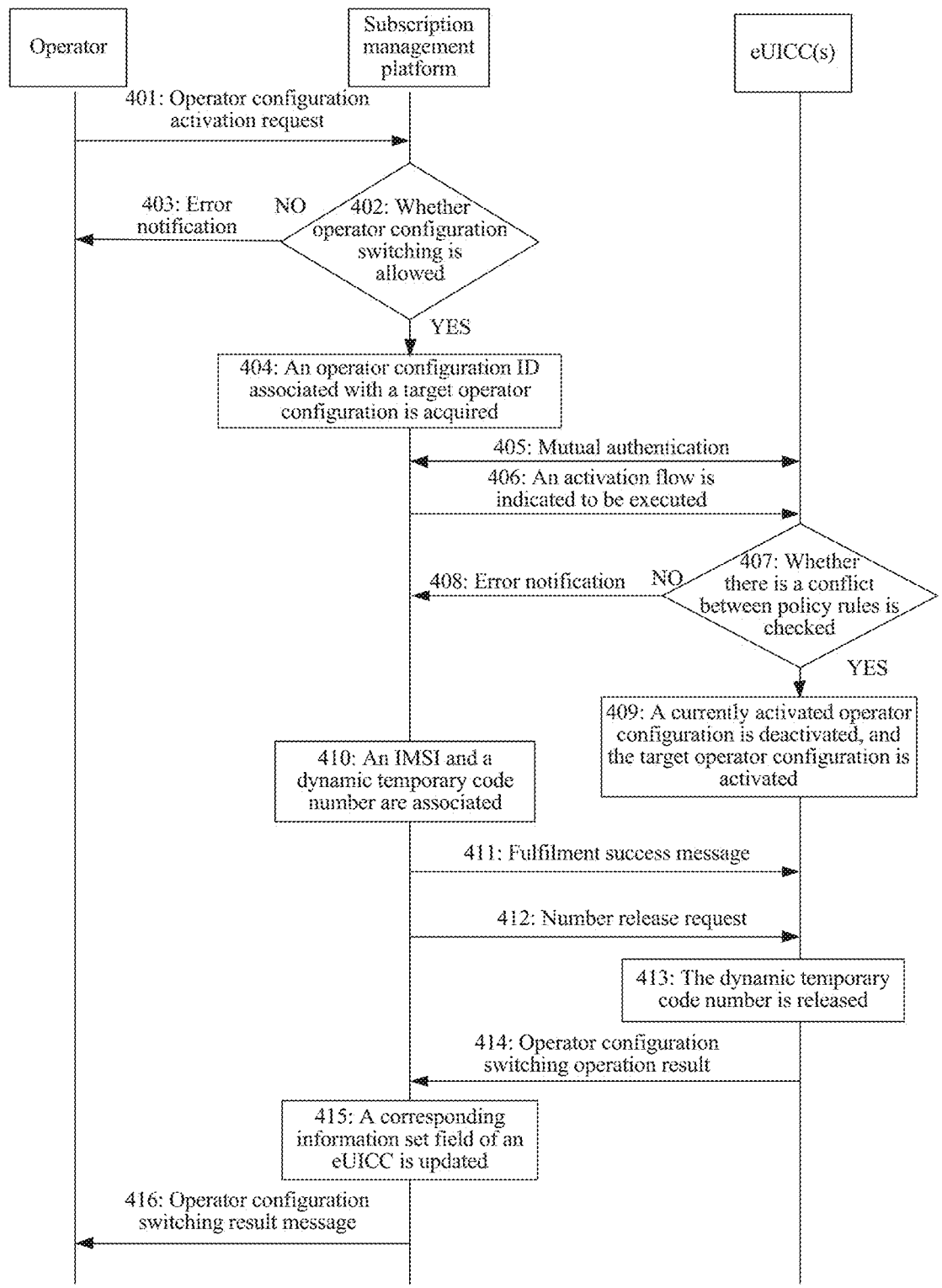
FIG. 7 is a flowchart of switching an operator configuration according to an embodiment of the disclosure.

An operator configuration activation flow between an operator and a subscription management platform is adopted to activate an operator configuration assembled on the eUICC, and the activation flow may be initiated by a user or a home operator required to activate an operator configuration. Processing over another operator configuration (i.e., an operator configuration required to be activated or a target operator configuration) assembled in the eUICC when there is an activated operator configuration on the eUICC will be described below in combination with FIG. 7. As shown in FIG. 7, operator configuration activation includes the following steps.

In Step 401, the operator sends an operator configuration activation request to the subscription management platform according to an eUICC activation request of a user (or the operator autonomously sends), the operator configuration activation request containing an MIST corresponding to a target eUICC (an eUICC where an operator configuration required to be activated is located), an identification code UICCID of the target eUICC and a dynamic temporary code number acquired by the eUICC.

In Step 402, the subscription management platform checks whether policy rules related to an operator configuration in an activated state and the target operator (the operator configuration required to be activated in the target eUICC) allow operator configuration switching.

Before Step 402, the subscription management platform checks whether the target eUICC has the operator configuration in the activated state according to states of operator configurations in an information set of the target eUICC, if YES, subsequent processing is executed, and if NO, a processing scope of the ninth embodiment is involved, and specific processing refers to records of the ninth embodiment.

In Step 403, if policy detection in Step 402 shows a conflict, the subscription management platform may terminate the flow and notify the related operator.

In Step 404, if policy detection in Step 402 succeeds, the subscription management platform queries associated information of the operator configurations in the information set, corresponding to the target eUICC, of the eUICC according to the IMSI and UICCID of the target eUICC, and acquires an operator configuration ID associated with the target operator configuration.

In Step 405, the subscription management platform performs necessary mutual verification with the eUICC.

In Step 406, the subscription management platform indicates the eUICC assembling the target operator configuration to execute an activation flow.

In Step 407, the eUICC checks whether there is a conflict between all currently executed policy rules and a policy rule related to the target operator configuration.

In Step 408, if policy detection in Step 407 shows a conflict, the eUICC may terminate the flow and send an errification to notify the subscription management platform.

In Step 409, if policy detection in Step 407 shows no conflict, the eUICC deactivates the operator configuration currently in the activated state, and activates the target operator configuration.

In Step 410, the subscription management platform associates the IMSI of the eUICC (an IMSI specified for the eUICC by the target operator configuration is different from the IMSI specified for the eUICC by the deactivated operator configuration) and a dynamic temporary code number.

In Step 411, the subscription management platform sends a fulfilment success message to the eUICC, the fulfilment success message including the dynamic temporary code number for the eUICC (specifically an Internet of things terminal with the eUICC required to be activated) to access an operator network by virtue of the IMSI and the dynamic temporary code number.

In Step 412, the eUICC receives a code number release request sent by t subscription management platform.

The code number release request includes the dynamic temporary code number, and the code number release request is sent after the subscription management platform receives an activation success message sent by the eUICC.

In Step 413, the eUICC releases the dynamic temporary code number according to the code number release request.

In Step 414, the eUICC sends an operator configuration switching operation result to the subscription management platform.

In Step 415, when an operator configuration switching operation succeeds, the subscription management platform updates an information set field corresponding to the eUICC, updates a state of the target operator configuration to be activated, and updates the state of the operator configuration originally in the activated state to be deactivated.

In Step 415, the subscription management platform returns an operator configuration switching result message to the operator to which the target operator configuration in the activated state belongs and an operator to which the operator configuration originally in the activated state (currently in a deactivated state) belongs, the message including IMSIs and UICCIDs corresponding to the operator configurations.

A state after the activation flow is executed is that: the target operator configuration and the associated operator configuration are in the activated state on the eUICC, the operator configuration originally in the activated state is in the deactivated state, and the corresponding field of the information set of the eUICC in the subscription management platform is updated.

Before the activation flow is executed, the following conditions are required.

A: the target operator configuration is in the deactivated state on the target eUICC, and there may also be another operator configuration in the activated state on the target eUICC.

B: a subscription related to the target operator configuration has been activated in the operator network.

C: the MIR of the target eUICC, an ID of the subscription management platform responsible for managing the target operator configuration and the UICCID of the target eUICC are all known to the operator.

Ninth Embodiment

After an eUICC assembles operator configurations, an assembled operator configuration (called as a target operator configuration or an operator configuration required to be activated in the embodiment) may further be activated to access an operator network by virtue of an executable application and file system assembled on the basis of the target operator configuration and use application and data functions provided by the operator network.

Figure 8:
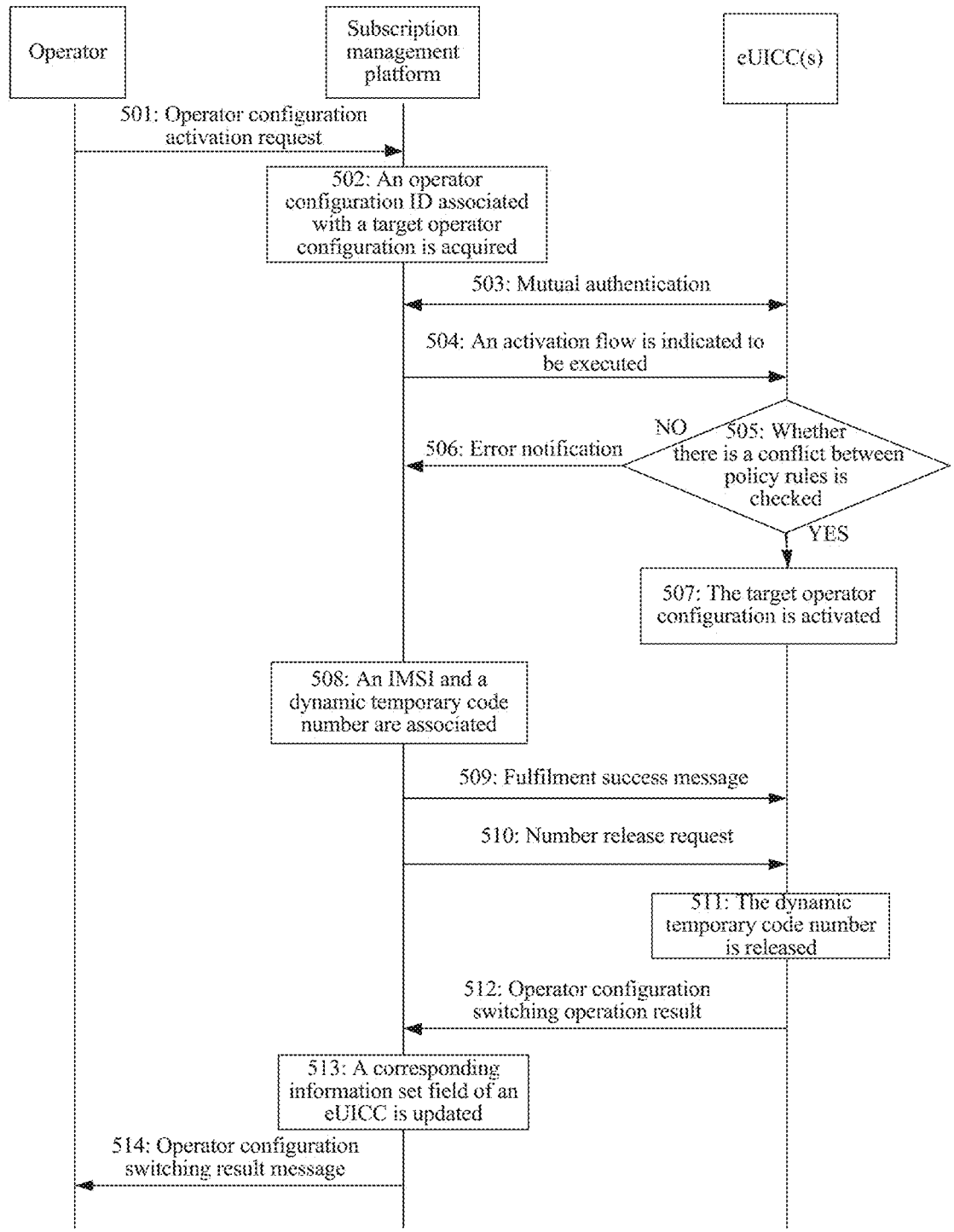
FIG. 8 is a flowchart of activating an operator configuration for the first time according to an embodiment of the disclosure.

An operator configuration activation flow between an operator and a subscription management platform is adopted to activate an operator configuration assembled on the eUICC, and the activation flow may be initiated by a user or a home operator required to activate an operator configuration. Processing of activating an operator configuration of the eUICC for the first time (i.e., operating configurations assembled by the eUICC are all in a deactivated state) will be described below in combination with FIG. 8. As shown in FIG. 8, operator configuration activation includes the following steps.

In Step 501, an operator sends an operator configuration activation request to a subscription management platform according to an eUICC activation request of a user, the operator configuration activation request containing an IMSI corresponding to a target eUICC, an identification code UICCID of the target eUICC and a dynamic temporary code number acquired by the eUICC.

In Step 502, the subscription management platform queries associated information of operator configurations in an information set, corresponding to the target eUICC, of the eUICC according to the IMSI of the target eUICC (the eUICC assembling a target operator configuration) and the UICCID of the target eUICC, and acquires an operator configuration ID associated with the target operator configuration.

Before Step 502, the subscription management platform checks whether the target eUICC has an operator configuration in an activated state according to states of the operator configurations in the information set of the target eUICC, if YES, a processing scope of the eighth embodiment is involved, and records of the eighth embodiment are specifically referred to, and if NO, it is indicated that there is no operator configuration activated in the target eUICC, and Step 502 and subsequent steps are executed.

In Step 503, the subscription management platform performs necessary mutual verification with the eUICC.

In Step 504, the subscription management platform indicates the eUICC assembling the target operator configuration to execute an activation flow.

In Step 505, the eUICC checks whether there is a conflict between all currently executed policy rules and a policy rule related to the target operator configuration.

In Step 506, if policy detection in Step 505 shows a conflict, the eUICC may terminate the flow and notify the subscription management platform.

In Step 507, the eUICC activates the target operator configuration.

In Step 508, the subscription management platform associates the IMSI of the eUICC and a dynamic temporary code number.

In Step 509, after associating the IMSI of the eUICC and the dynamic temporary code number, the subscription management platform sends a fulfilment success message to the eUICC, the fulfilment success message including the dynamic temporary code number for the eUICC to access an operator network by virtue of the IMSI and the dynamic temporary code number.

In Step 510, the subscription management platform sends a code number release request to the eUICC, the code number release request including the dynamic temporary code number and the code number release request being sent after the subscription management platform receives an activation success message sent by an Internet of things terminal.

In Step 511, the eUICC releases the dynamic temporary code number according to the code number release request.

In Step 512, the subscription management platform sends an operator configuration switching operation result.

In Step 513, when an operator configuration switching operation succeeds, the subscription management platform updates an information set field corresponding to the eUICC, and updates a state of the target operator configuration to be activated.

In Step 514, the subscription management platform returns an operator configuration operation result message to the operator to which the target operator configuration belongs, the message including the IMSI and UICCID corresponding to the operator configuration.

A state after the activation flow is executed is that: the target operator configuration and the associated operator configuration are in the activated state on the eUICC, and the corresponding field of the information set of the eUICC in the subscription management platform is updated (such a condition is that an entry corresponding to the target operator configuration and the state is added into information).

Before the flow is executed, the following conditions are required.

A: the target operator configuration is in a deactivated state on the target eUICC, and there is no operator configuration in the activated state on the target eUICC.

B: a subscription related to the target operator configuration has been activated in the operator network.

C: the IMSI of the target eUICC, an ID of the subscription management platform responsible for managing the target operator configuration and the UICCID of the target eUICC are all known to the operator.

Ninth Embodiment

Figure 9:
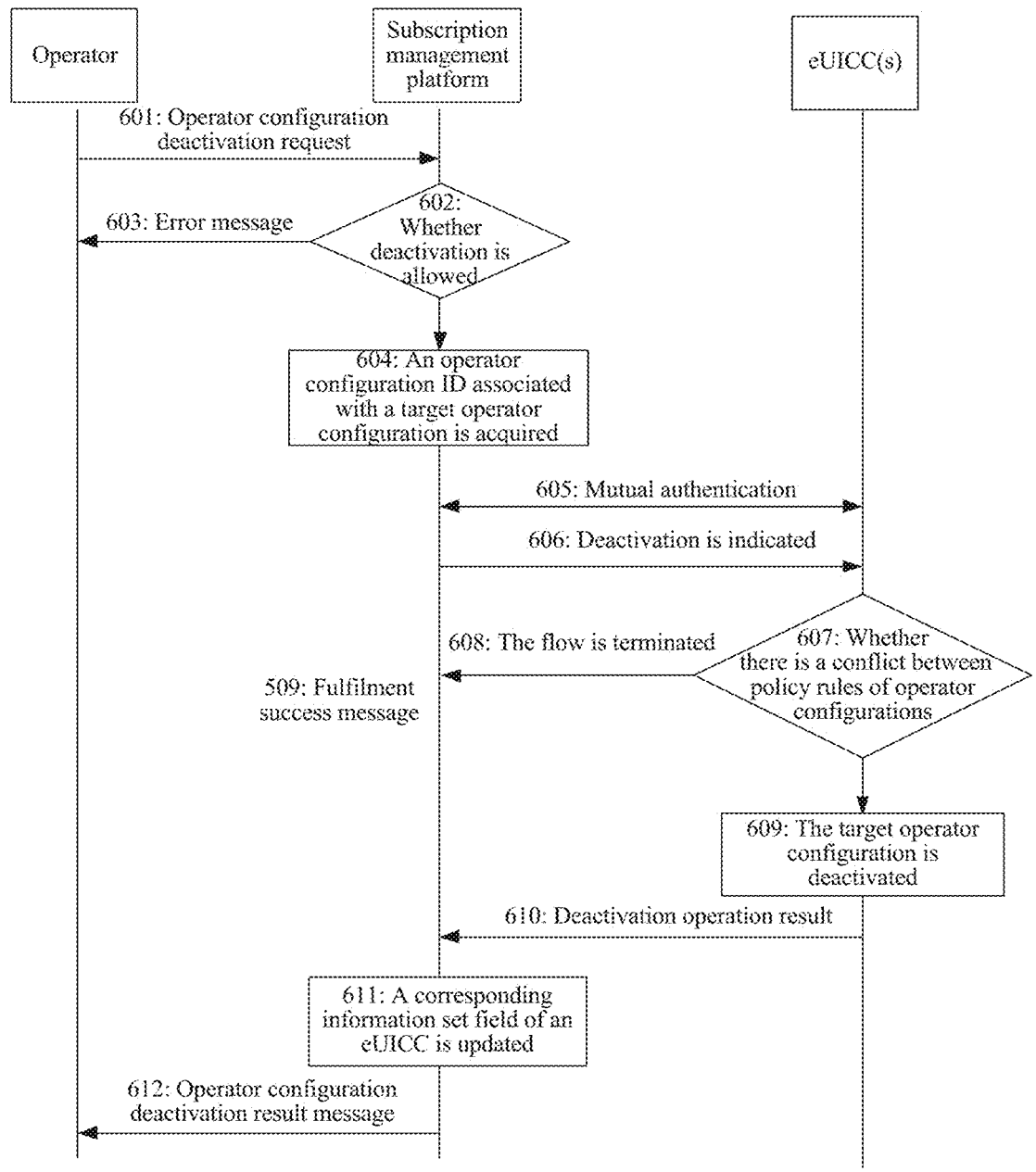
FIG. 9 is a flowchart of deactivating an operator configuration according to an embodiment of the disclosure.

When an operator configuration is in an activated state on a target eUICC, as shown in FIG. 9, if the operator configuration is required to be deactivated, the following steps may be executed.

In Step 601, an operator sends an operator configuration deactivation request to a subscription management platform, the deactivation request containing an IMSI of a target eUICC (an eUICC required to perform a deactivation operation) and a UICCID of the target eUICC.

In Step 602, the subscription management platform detects whether a target operator configuration is allowed to be deactivated according to a policy rule related to the target operator configuration (an operator configuration to be deactivated).

In Step 603, if policy detection in Step 602 shows a conflict, the subscription management platform may terminate the flow and send an error message to the related operator.

In Step 604, if policy detection in Step 602 succeeds, the subscription management platform queries associated information of an operator configuration in a corresponding information set according to the IMSI of the target eUICC and the UICCID of the target eUICC, and acquires an operator configuration ID corresponding to the target operator configuration.

In Step 605, the subscription management platform performs necessary mutual verification with the target eUICC.

In Step 606, the subscription management platform indicates the eUICC assembling the target operator configuration to execute a deactivation flow of the target operator configuration.

The subscription management platform may further indicate an operator configuration in a deactivated state on the eUICC to be activated to enable the eUICC to use application and data functions provided by an operator.

In Step 607, the eUICC detects whether there is a conflict between the policy rule of the operator configuration currently in the activated state and a policy rule related to the operator configuration to be activated.

In Step 608, if policy detection in Step 607 shows a conflict, the eUICC may terminate the flow and notify the subscription management platform, In Step 609, if detection in Step 607 succeeds, the eUICC deactivates the target operator configuration.

The eUICC may further activate an operator configuration assembled by the eUICC in a deactivated state according to an indication of the subscription management platform, and at this moment, since all operator configurations assembled by the eUICC are in the deactivated state, processing of activating the operator configuration in the deactivated is the same as the eighth embodiment, and will not be elaborated herein.

In Step 610, the eUICC sends an operator configuration deactivation operation result to the subscription management platform.

In Step 611, if a deactivation operation succeeds, the subscription management platform may update an information set field corresponding to the eUICC, update the target of the target operator configuration to be deactivated, and if the eUICC is also indicated to activate the operator configuration in the deactivated state, update the operator configuration activated by the eUICC to be activated.

In Step 612, the subscription management platform sends an operator configuration deactivation result message to the related operator, the message containing the IMSI and UICCID corresponding to the operator.

A state after the activation flow is executed is that: the target operator configuration and the associated operator configuration are in the activated state on the eUICC, and an operator configuration assembled by the eUICC is in the activated state, and the corresponding field of the information set of the eUICC in the subscription management platform is updated.

Tenth Embodiment

In the field of smart vehicles, there is made such a hypothesis that a user of a vehicle is expected to use smart service provided by an operator, and before an eUICC on the vehicle is used, a generated operator configuration is required to be transmitted into the eUICC according to a request of the user, and meanwhile, the eUICC is required to assemble the downloaded configuration into an executable application and file system, including allocation of a resource to the configuration and registration of a related parameter. A subscription management platform transmits the generated operator configuration into the eUICC according to the request of the user. Since there is no practical physical interface between the subscription management platform and the eUICC, the subscription management platform is required to establish a transmission channel to the eUICC to download the operator configuration, and the eUICC assembles the downloaded operator configuration into the executable application and file system. Such a process includes allocation of the resource for the operator configuration and registration of the related parameter. Assembling of the operator configuration and downloading of the operator configuration are usually performed at the same time, and an operator configuration which is successfully assembled enters a deactivated state as a default. Specific operation steps are as follows.

The user initiates a request of enabling the service for the first time through the eUICC, which is converted into sending of an operator configuration downloading request to the subscription management platform to request the subscription management platform to download the operator configuration into the eUICC. The downloading request includes an IMSI, a UICCID and the like, the user inputs an operator configuration downloading credential and an ID of the subscription management platform or an address of the subscription management platform into the eUICC, and the eUICC sends the operator configuration downloading request to the subscription management platform.

The subscription management platform verifies whether the operator configuration downloading credential contained in the operator configuration downloading request is consistent with a credential stored in the subscription management platform, and if YES, obtains the operator configuration requested to be downloaded according to the UICCID.

The subscription management platform acquires an information set of the eUICC according to the IMSI, and determines whether the eUICC may download the operator configuration corresponding to the UICCID according to existing operator configurations in the eUICC and a physical state of the eUICC, for example, an available storage size, and if the eUICC may download the operator configuration, the subscription management platform determines whether a storage block may be created in the eUICC.

Data routing of the subscription management platform performs mutual authentication with the eUICC to establish a secure link to the eUICC, and sends a storage block creation request to the eUICC.

The eUICC creates the storage block according to the request. The eUICC sends a storage block creation response to the subscription management platform. Data preparation of the subscription management platform performs mutual authentication with the eUICC, after authentication succeeds, an operator configuration security protection key is established between the subscription management platform and the eUICC, and the subscription management platform uses the security key established in the previous step to perform encryption and integrity protection on the operator configuration required to be downloaded.

The subscription management platform sends the encrypted operator configuration to the eUICC.

After verifying security of data, the eUICC decrypts and assembles the operator configuration.

The eUICC sends an operator configuration downloading completion message to the subscription management platform, wherein its confirmation message may be authenticated by data routing and data preparation functions of the subscription management platform respectively, and indicates that the operator configuration has been successfully assembled in the eUICC. The subscription management platform updates the information set of the eUICC. The operator configuration which is successfully assembled enters the deactivated state as a default. The operator configuration is subsequently selected to be activated or switched according to a requirement of the user.

The above is only the preferred implementation case of the disclosure and not intended to limit the disclosure. The disclosure may further have various other embodiments. Those skilled in the art may make various corresponding variations and transformations according to the disclosure without departing from the spirit and essence of the disclosure, but these corresponding variations and transformations shall fall within the scope of protection of the appended claims of the disclosure.

Those skilled in the art should know that: all or part of the steps implementing the abovementioned method embodiment may be implemented by instructing related hardware through a program, the program may be stored in a computer-readable storage medium, and the program is executed to execute the steps of the abovementioned method embodiment; and the storage medium includes: various media capable of storing program codes such as mobile storage device, a RAM, a ROM, a magnetic disk or an optical disk.

Or, when being implemented in form of software function module and sold or used as an independent product, the integrated unit of the disclosure may also be stored in a computer-readable storage medium. Based on such an understanding, the technical solutions of the embodiments of the disclosure substantially or parts making contributions to the related technology may be embodied in form of software product, and the computer software product is stored in a storage medium, including a plurality of instructions configured to enable a piece of computer device (which may be a personal computer, a server, network device or the like) to execute all or part of the method in each embodiment of the disclosure. The abovementioned storage medium includes: various media capable of storing program codes such as mobile storage device, a RAM, a ROM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. An operator configuration processing method, comprising:
   acquiring, by an embedded Universal Integrated Circuit Card (eUICC), an operator configuration transmitted by a subscription management platform;
   assembling, by the eUICC, the operator configuration into an executable application and file system in an allocated storage space; and
   sending, by the eUICC, an operator configuration downloading completion message to the subscription management platform,
   wherein the subscription management platform has an information set corresponding to the eUICC, the information set records operator configurations which have already been assembled by the eUICC and states of the operator configurations, the state indicates whether the operator configuration is activated or deactivated, and
   wherein the operator configuration downloading completion message is configured for the subscription management platform to add the acquired operator configuration and the state of the acquired operator configuration into the information set.

2. The method according to claim 1, wherein acquiring, by the eUICC, the operator configuration transmitted by the subscription management platform comprises:
   sending, by the eUICC to the subscription management platform, an operator configuration downloading request for the operator configuration,
   wherein the operator configuration downloading request comprises an operator configuration downloading credential for the subscription management platform to verify the operator configuration downloading request, and to accept the operator configuration downloading request when verification succeeds.

3. The method according to claim 1, wherein acquiring, by the eUICC, the operator configuration transmitted by the subscription management platform comprises:
   performing, by the eUICC, mutual authentication with the subscription management platform to establish a first secure link; and
   creating the storage space in the eUICC according to a storage block creation request sent by the subscription management platform on the basis of the first secure link.

4. The method according to claim 1, wherein acquiring, by eUICC, the operator configuration transmitted by the subscription management platform comprises:
   performing, by eUICC, mutual authentication with the subscription management platform to establish a second secure link and an operator configuration security protection key; and decrypting the operator configuration acquired on the basis of the second secure link and subjected to encryption and integrity protection with the key, so as to obtain the operator configuration.

5. The method according to claim 1, further comprising:
when the subscription management platform accepts an operator configuration activation request, checking whether there is a conflict between a currently executed policy rule and a policy rule related to a target operator configuration, wherein the target operator configuration is an operator configuration required to be activated in the operator configurations assembled in the eUICC; and
if there is no conflict, activating the target operator configuration.

6. The method according to claim 5, wherein activating the target operator configuration comprises:
checking whether there is an operator configuration in an activated state in the operator configurations assembled by the eUICC;
if there is an operator configuration in an activated state, deactivating the operator configuration in the activated state, and activating the target operator configuration; and
if there is no operator configuration in an activated state, directly activating the target operator configuration.

7. The method according to claim 5, further comprising:
notifying an operation result of activation of the target operator configuration to the subscription management platform; and
enabling the subscription management platform to update the states of the operator configurations assembled by the eUICC in the information set corresponding to the eUICC.

8. The operator configuration processing method according to claim 1, further comprising:
verifying, by the subscription management platform, an operator configuration downloading request of a user or an operator; and
when verification succeeds and it is determined that the eUICC supports downloading of the operator configuration, transmitting the operator configuration to the eUICC.

9. The method according to claim 8, wherein verifying, by the subscription management platform, the operator configuration downloading request of the user or the operator comprises:
when a requester is the operator, determining whether to transmit the operator configuration to the eUICC on the basis of whether the operator configuration requested by the configuration downloading request belongs to the operator; and
when the requester is the user, determining whether to transmit the operator configuration to the eUICC on the basis of whether an operator configuration downloading credential contained in the configuration downloading request is consistent with a stored credential.

10. The method according to claim 8, wherein determining that the eUICC supports downloading of the operator configuration comprises:
determining that the eUICC supports downloading of the operator configuration on the basis of a preset policy rule and on the basis of the operator configuration already assembled by the eUICC in the information set corresponding to the eUICC; and determining that the eUICC supports downloading of the operator configuration on the basis of a physical state of the eUICC.

11. An embedded Universal Integrated Circuit Card (eUICC), comprising:
a processor; and
a memory for storing instructions executable by the processor,
wherein the processor is arranged to:
acquire an operator configuration transmitted by a subscription management platform;
assemble the operator configuration into an executable application and file system in an allocated storage space; and
send, by the eUICC, an operator configuration downloading completion message to the subscription management platform,
wherein the subscription management platform has an information set corresponding to the eUICC, the information set records operator configurations which have already been assembled by the eUICC and states of the operator configurations, the state indicates whether the operator configuration is activated or deactivated, and
wherein the operator configuration downloading completion message is configured for the subscription management platform to add the acquired operator configuration and the state of the acquired operator configuration into the information set.

12. The eUICC according to claim 11, wherein acquiring the operator configuration transmitted by the subscription management platform comprises:
sending, to the subscription management platform, an operator configuration downloading request for the operator configuration,
wherein the operator configuration downloading request comprises an operator configuration downloading credential for the subscription management platform to verify the operator configuration downloading request, and to accept the operator configuration downloading request when verification succeeds.

13. The eUICC according to claim 11, wherein acquiring the operator configuration transmitted by the subscription management platform comprises:
performing mutual authentication with the subscription management platform to establish a first secure link; and
creating the storage space in the eUICC according to a storage block creation request sent by the subscription management platform on the basis of the first secure link.

14. The eUICC according to claim 11, wherein acquiring, by eUICC, the operator configuration transmitted by the subscription management platform comprises:
performing mutual authentication with the subscription management platform to establish a second secure link and an operator configuration security protection key; and
decrypting the operator configuration acquired on the basis of the second secure link and subjected to encryption and integrity protection with the key, so as to obtain the operator configuration.

15. The eUICC according to claim 11, wherein the processor is further arranged to:
when the subscription management platform accepts an operator configuration activation request, check whether there is a conflict between a currently executed policy rule and a policy rule related to a target operator configuration, wherein the target operator configuration is an operator configuration required to be activated in the operator configurations assembled in the eUICC; and if there is no conflict, activate the target operator configuration.

16. The eUICC according to claim 15 wherein the processor is further arranged to:

check whether there is an operator configuration in an activated state in the operator configurations assembled by the eUICC;

if there is an operator configuration in an activated state, deactivate the operator configuration in the activated state, and activate the target operator configuration; and if there is no operator configuration in an activated state, directly activate the target operator configuration.

17. The eUICC according to claim 15, wherein the processor is further arranged to:

notify an operation result of activation of the target operator configuration to the subscription management platform; and enable the subscription management platform to update the states of the operator configurations assembled by the eUICC in the information set corresponding to the eUICC.

18. A non-transitory computer storage medium, in which an executable instruction is stored, the executable instruction being configured to execute an operator configuration processing method, the method comprising:

acquiring, by an embedded Universal Integrated Circuit Card (eUICC), an operator configuration transmitted by a subscription management platform;

assembling, by the eUICC, the operator configuration into an executable application and file system in an allocated storage space; and sending, by the eUICC, an operator configuration downloading completion message to the subscription management platform, wherein the subscription management platform has an information set corresponding to the eUICC, the information set records operator configurations which have already been assembled by the eUICC and states of the operator configurations, the state indicates whether the operator configuration is activated or deactivated, and wherein the operator configuration downloading completion message is configured for the subscription management platform to add the acquired operator configuration and the state of the acquired operator configuration into the information set.

* * * * *